United States Patent [19]

Morris et al.

[11] 3,958,711
[45] May 25, 1976

[54] EGG TRAY

[75] Inventors: Robert C. Morris, Trappe; Raymond C. Gantert, Cambridge, both of Md.

[73] Assignee: Multifax Corporation, Easton, Md.

[22] Filed: Sept. 18, 1975

[21] Appl. No.: 614,611

[52] U.S. Cl. .............................. 217/26.5; 119/43; 206/509
[51] Int. Cl.² ........................................ B65D 85/32
[58] Field of Search ............ 217/26, 26.5; 220/23.2, 220/23.8, 22; 119/43; 206/509

[56] References Cited
UNITED STATES PATENTS

| | | | |
|---|---|---|---|
| 3,147,738 | 9/1964 | Theilig | 119/43 |
| 3,470,851 | 10/1969 | Cannon | 217/26.5 |
| 3,489,124 | 1/1970 | Cannon | 217/26.5 |
| 3,817,215 | 6/1974 | Levin | 217/26.5 |

Primary Examiner—George E. Lowrance
Assistant Examiner—Allan N. Shoap
Attorney, Agent, or Firm—Dorfman, Herrell and Skillman

[57] ABSTRACT

Egg trays for containing and transporting eggs in successive layers. Each tray comprises an array of staggered egg-supporting skirts disposed in transverse and longitudinal rows. Each row of skirts occupies a sequentially alternating upper and lower plane. The skirts are formed by a series of integrally connected, tubular receptacles made from a semirigid molded plastic. Each skirt is so shaped that the upper perimeter of the skirt is adapted to receive the pointed end of an egg and retain it in a stable position during handling and tilting of the tray. Lateral support for the eggs on the perimeter of the tray when it is tilted from the horizontal is provided by a plurality of upstanding lugs and fingers spaced around the periphery of the tray. Each tray also has at least three vertical support pedestals located in the interior portion of the tray for holding a tray in stacking arrangement immediately above it. The upper end of each pedestal terminates in the same horizontal plane and is located above the topmost end of the eggs when situated in the skirts. Acting as a male member, the upper end of each support pedestal is adapted to engage a socket in the lower end of the support pedestal in the tray immediately above it. The lower ends of each support pedestal and the base of the socket in each pedestal occupy, respectively, the two closely spaced horizontal planes. The socket recess is adapted to receive and interlock with the upper end of the corresponding support pedestal of the tray below, thus providing lateral support as well as vertical support for each tray in stacked arrangement.

10 Claims, 6 Drawing Figures

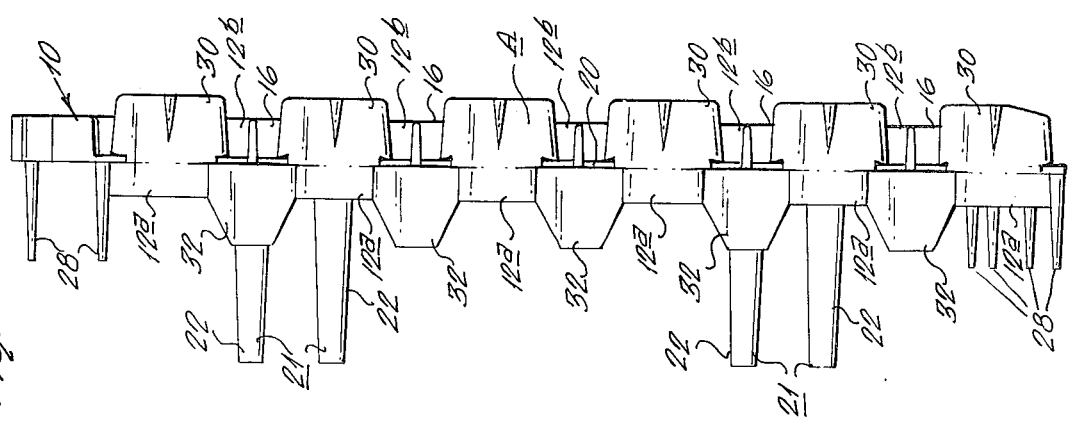
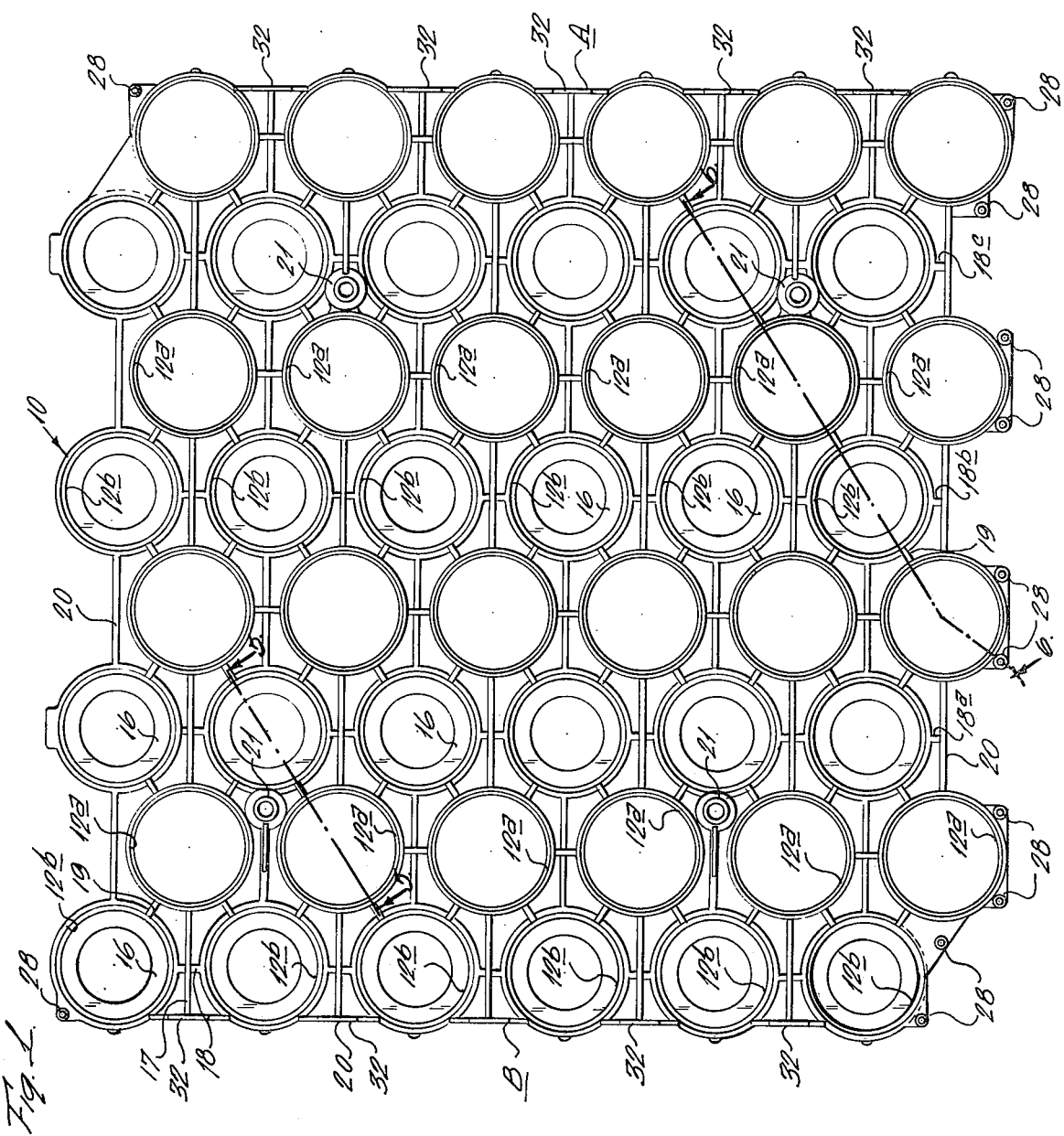

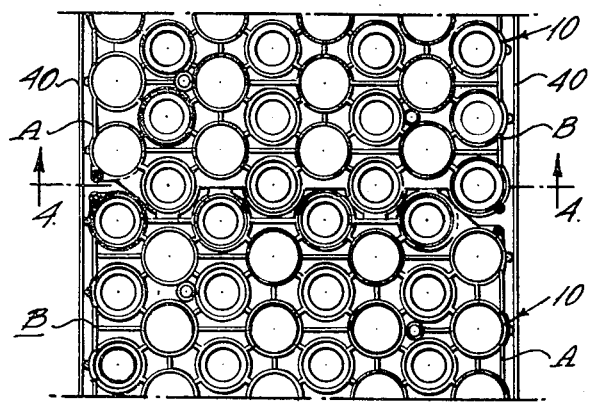
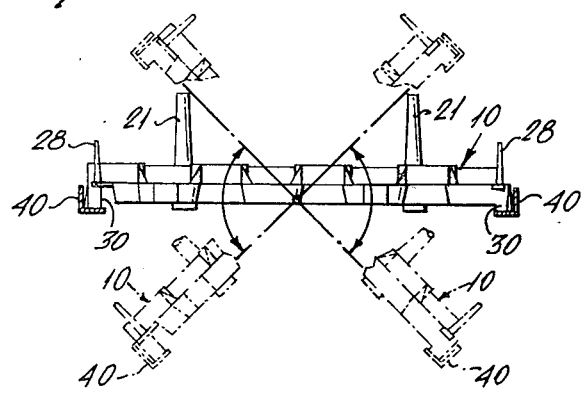
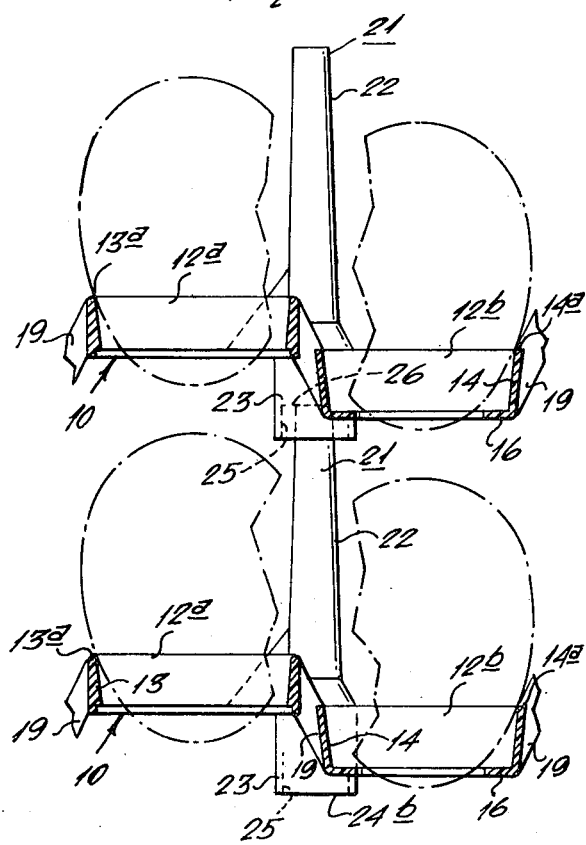
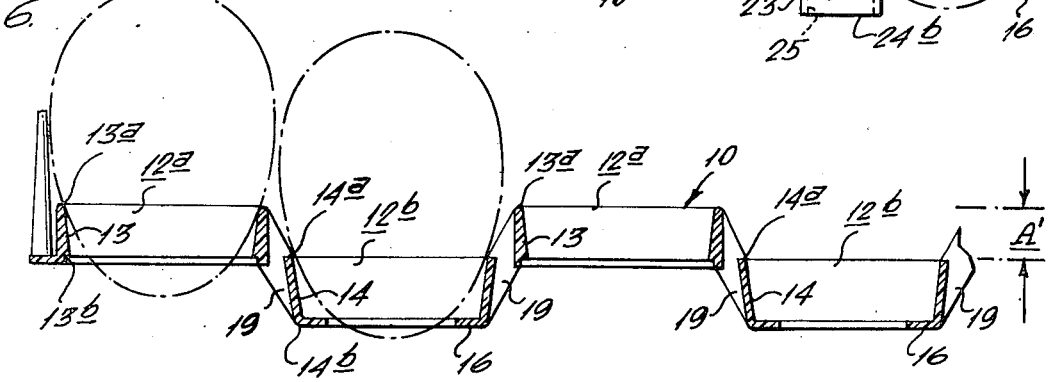

EGG TRAY

The present invention relates to egg trays or flats, and has particular application to egg trays for containing and safely transporting a plurality of eggs in compact arrangement. The invention can be employed in the transporting of eggs from the laying house to the egg processing plant for preparation for market and it has particular utility in the transportation of eggs from producing farms to commercial hatcheries for placement of the eggs in incubators.

Egg trays are commonly used to support and separate the eggs in cases, typically corrugated boxes. Originally, a lattice of intersecting cardboard strips was positioned in the cases and the eggs were deposited in the cells provided by the strips. Upon filling each layer, flats were laid over the lattice and a fresh layer was started. As an improvement upon this procedure, molded pulp filler flats were provided which perfomed the dual function of supporting the eggs in each layer and separating the eggs within that layer. The use of the molded pulp filler flat enabled the flat to be loaded independently and transferred into the cases while in a loaded condition. The inherent flexibility of the molded pulp flats permitted inadvertent crushing of the eggs in the handling of the loaded flats, particularly when the eggs were of large size. Pulp flats are also quickly contaminated and must be replaced frequently. For instance, when an egg is broken in a pulp flat, the flat becomes dirty. There is no feasible way to clean it for re-use and so it must be discarded.

The pulp flats are normally molded from a continuous sheet of material and do not provide for ventilation of the eggs within the cells of the flat. Because of the lack of ventilation, the eggs in the flats tend to retain the body heat of the eggs, and, furthermore, the nature of the pulp tends to extract moisture from the eggs at the elevated temperature. Such moisture loss accelerates the deterioration of the eggs.

Where the eggs are being transported to a hatchery in pulp flats or trays, upon arrival they must be removed from the cases and flats by hand or by mechanical means and placed in a standard steel incubator tray approximately one foot wide and three feet long. These steel trays, when filled, are placed in incubators having spaced apart flanges designed to receive them for the normal eighteen day incubation process. It is readily apparent that the procedure has several inefficient and uneconomic traits. A considerable amount of handling of the eggs is required with the attendant, increasing risk of breakage and costly additional labor.

In order to overcome the undesirable features of the molded pulp flats, various attempts were made to manufacture flats from plastic material. Using this improved tray, the hatching, transportation, and handling of eggs has been simplified. The eggs are placed in the plastic flats at the farm, transported to the hatchery and, on arrival, placed directly into flanges of the incubator holding frames without the need for transferring them to the standard steel trays. The amoung of handling is thus reduced and, as a result, the costs due to breakage and extra labor formerly needed are greatly reduced. Further, the plastic trays are readily cleaned and reusable, resulting in additional replacement cost savings over the long run.

However, the plastic flats which are available have not ben entirely satisfactory because of the possibility of excessive breakage of extra large eggs during handling and the likelihood of the material from the broken eggs contaminating the other eggs in the tray or in the stack of trays. In addition, the minority of hatcheries having incubators employing plastic trays have experienced several capacity limitations in the number of eggs they handle. One of the plastic trays used in these hatcheries is approximately twelve inches square and holds only thirty-six eggs in a rectilinear pattern of six rows by six rows. Thus, three flats, the number that can be accommodated in a typical incubator tray space of one foot by three feet, can hold only one hundred and eight eggs.

Another disadvantage of this kind of plastic tray is that the square compartments of the flats in which the eggs are placed are all on one plane and because of rigid space limitations around the perimeter are thus not large enough to receive extra large eggs which, because of the improved breeding techniques, have become more prevalent today. A final disadvantage of such trays is that a substantial amount of the plastic material had to be devoted to forming lateral supports or walls for the eggs to prevent them from falling out of the tray during handling or tilting and to prevent egg-to-egg contact. These supports or walls increase the expense in fabricating the trays and obstruct the air flow paths for ventilating the eggs during incubation.

After extensive testing, it has been found that with a tray according to the present invention, that separating members designed to prevent egg-to-egg contact are not necessary to prevent breakage. If eggs are placed in holding members of sufficient diameter or breadth, their depth within these members is sufficient to prevent sufficient lateral force being exerted on the eggs to cause breakage even though adjacent eggs might be touching each other and even when the tray is tilted as much as 50°.

In addition to these enumerated disadvantages, the steel trays now used by a majority of egg hatcheries are also subject to capacity limitations. Eggs are placed in these trays in a staggered and abutting relationship. All eggs must be placed on the single plane defined by the tray bottom. This pattern of packing allows the hatchery to place one hundred and forty-four eggs of average size in the same three square foot area that would accommodate only one hundred and eight eggs if the plastic trays were used. However, if the eggs being placed in steel trays are larger than average in size, only one hundred and thirty-six or one hundred and forty can be placed in the steel tray because the larger egg diameters limit the number that can be placed within the confines of the steel tray walls. Thus, incubator capacity is reduced.

With the foregoing in mind, the present invention provides a molded egg tray which is sufficiently rigid to avoid damage to the eggs by reason of flexure of the tray during handling of the loaded trays and which eliminates the need for egg separating members.

Another object of the present invention is to provide an egg tray which may be used for containing and supporting a wide range of eggs of varying sizes, and especially larger sizes, without reducing the egg-holding capacity of each tray.

Another object of the present invention is to provide a unique two plane positioning which effectively reduces the areas of maximum diameter contact between the eggs and therefore allows more large eggs to be placed within a rigid, fixed confining perimeter than would be possible for the same eggs if placed on only one plane.

Still another object of the present invention is to provide a tray in which walls or partitions confining the eggs are eliminated, thereby affording ample air flow around the eggs during the incubation process.

Still another object of the invention is to provide a tray which is readily cleaned and sanitized so that it is longlived in operation and can be continuously reused.

The invention also provides trays which may be stacked in multiple layers without danger of lateral displacement and toppling of the uppermost trays. At the same time, the tray configuration is such that the trays, when empty, may be nested in a compressed stack to occupy a minimum of space.

The present invention provides an egg tray which is of a one-piece plastic construction which is fully effective in operation and use and yet which is economical to produce.

Further, the present invention makes it possible for hatcheries using steel tray incubators to eliminate the need for pulp flats and steel trays, and thereby reduce the costs due to handling and breakage of the eggs and contamination of the pulp flats.

Yet another object of the invention is to provide a tray in which the lateral forces generated by egg-to-egg contact in the tray will not cause breakage.

Another object of the invention is to provide a tray having closely-spaced skirt-like, egg-holding receptacles of sufficient diameter to prevent the eggs from falling out of the skirt receptacles on the flat when it is tilted from the horizontal plane to an angle of 50° in upward and downward directions.

All of the objects of the invention are more fully set forth hereinafter and will be more apparent with reference to the accompanying drawings, wherein:

FIG. 1 is a top plan view of an egg tray embodying the present invention;

FIG. 2 is a righthand side view of the plan of FIG. 1;

FIG. 3 is a top fragmentary plan view of two trays shown in mating relationship;

FIG. 4 is a sectional view along stepped section line 4—4 of FIG. 3 illustrating in phantom the tilting of the tray approximately 50° upwardly and downwardly from the horizontal;

FIG. 5 is a fragmentary sectional view tken along line 5—5 of FIG. 1 showing the interlock between two egg-containing trays in stacked arrangement; and FIG. 6 is a fragmentary sectional view taken along line 6—6 of FIG. 1 showing the bi-planar arrangement of the alternating egg-containing rows of tubular receptacles or skirts.

In the gathering of eggs, the eggs are collected in the laying house in trays which are placed empty on a carrier or conveyor. After the trays are filled with eggs, they are conveyed to a packing area where the trays are deposited in cases or other containers. These cases or containers are transported by truck to the next processing stage which may be an incubation room for fertile eggs or a sorting and grading room for market eggs.

During handling, the eggs are subject ot breakage and it is desirable to limit such handling so that the broken eggs do not contaminate the other eggs being handled. Furthermore, during hndling, it is desirable to provide ample ventilation for the eggs to expedite the loss of animal heat and the cooling of the eggs to a desirable temperature.

The present invention provides an egg tray which is designed to hold a maximum amount of eggs, even large eggs, in a stable position within a minimum amount of space, minimize the lateral forces generated by egg-to-egg contact, thereby reducing the amount of breakage, and provide ample ventilation when the egg trays are stacked in close relation on top of the other. The trays of the present invention are of a uniform size and shape so that they may be readily nested one upon the other in compressed layers when not in use. By the same token, the design is such that the trays may be stacked in a stable interlocked group in vertically spaced relation to accommodate eggs therebetween by simply reorienting alternate trays.

With reference to the drawings, FIG. 1 shows a top plan view of a lightweight unitary body egg tray or flat 10 preferred embodiment. In a preferred form, the trays or flats can be made by a one-step molding process from a plastic material having low shrinkage, high memory, high resiliency, capable of withstanding elevated temperatures for extended periods of time, such as those formed in egg incubators without significant dimensional changes or degradation of the material. Among other suitable plastics, linear polyethylene or polypropylene could be used.

The base is comprised of a series of integrally connected egg-holding tubular receptacles or skirts 12a and 12b. These tubular receptacles or skirts 12a and 12b are aligned in a series of transverse and longitudinal rows in a staggered relation to one another as illustrated in the top plan view of FIG. 1. The eight longitudinal rows run parallel to sides A and B. Each row contains a series of six co-planar egg-holding receptacles or skirts. Four of the rows reside in an upper plane while the four remaining rows reside, in alternate sequence, with the upper rows. in a lower plane. The twelve transverse rows run parallel to ends of the tray. Each row contains four tubular receptacles or skirts. Six of the rows reside in the upper plane occupied by four of the longitudinal rows while the six remaining rows reside, in alternate sequence, with the upper rows, in the lower plane occupied by the four longitudinal rows.

The skirts in any given longitudinal row or transverse row occupy alternately upper and lower parallel co-planar spaces. The upper skirts are designated 12a and the lower skirts are designated 12b in FIG. 1. The skirts may assume a variety of geometrical forms. In the preferred embodiment, the skirts 12a and 12b are formed by the upper and lower frustoconical side walls 13 and 14, respectively. These upper and lower skirt side walls 13 and 14 have uniform upper perimeters 13a and 14a, respectively, having an inner diameter adapted to receive the narrowed tip ends of eggs, as illustrated in FIGS. 5 and 6. The upper perimeters 13a of the upper skirts 12a all reside in the same plane slightly higher than the plane defined by upper perimeters 14a of the lower skirts 12b. The distance A between the planes defined by perimeters of the upper and lower skirts is selected to maximize the number of eggs which can be held by a tray within the fixed limits of an incubator or case. The inside diameter of the upper perimeters 13a, 14a of the upper and lower skirt walls 13 and 14 is chosen so that the skirt can receive and hold eggs over a large variety of sizes and be able to retain these eggs in stable relation when the tray is tilted 45°–50° from the horizontal. A typical inside diameter of the upper perimeter should be at least 1½ in., and the typical vertical distance A' between the planes defined by the upper perimeters 13a, 14a of the upper and lower skirts 12a, 12b can be ½ inch or more. These dimensions can be modified to optimize egg-holding capacity of trays for eggs having varying size distributions.

The walls 13 and 14 of the upper and lower skirts 12a, 12b converge downwardly and terminate in a downward projection at their lower outside perimeters 13b and 14b, respectively. The angle of convergence of the skirt wall is less than the angles of convergence of lower portion of the egg immediately below the upper perimeters 13a, 14a of the skirts. The lower perimeters 13b of the upper skirt 12a defines the circular lower orifice within the skirt which provides clearance for the lowermost part of an egg. At the lower perimeter 14b of the lower set of skirts, however, the plastic side wall 14 angles inwardly in a horizontal direction and continues inwardly for a small distance to form an annular-shaped horizontal flange 16 at the base of the lower skirt 12b. This annular flange 16 adds to the structural stability of the tray 10 and provides an orifice which also provides clearance for the lowermost part of an egg.

The skirts 12a, 12b are joined in rigid, integral relation by sets of vertical ribs 17, 18, 19 and 20. The relatively longer ribs 17 join each row of upper and lower skirts 12a, 12b to the adjacent skirts in the same transverse row and join the skirts at the end of each row to the peripheral rib 20. Relatively shorter ribs 18 are located at right angles to the longer ribs 17 and join the upper and lower skirts 12a, 12b to, respectively, the upper and lower skirts in the same longitudinal row in the tray. Each of the ribs 17 and 18 is disposed in either the upper or the lower level of skirts and the upper and lower ribs barely intersect where the upper rib crosses over the lower rib. In three instances, 18a, 18b, 18c, the shorter ribs join the transverse rows of lower skirts to the peripheral rib 20. Diagonal ribs 19 are positioned at acute complementary angles to the ribs 17 and 18 and alternately connect the upper and lower skirts 12a, 12b with, respectively, the nearest equidistant lower and upper skirts occuppying a different plane. The diagonal ribs 19 cooperate with the upper and lower skirt walls 13 and 14 and the annular flange 16 of the lower skirt 12b to interconnect the upper and lower levels of skirts and ribs, giving structural stability to the tray and maintaining the skirts in their tubular form.

Each tray is provided with four vertical spaced apart support pedestals 21 integral with the tray. The pedestals are all of equal size and are formed by two integral sections: an upwardly tapering section 22 having such height that it will extend above the topmost part of the largest eggs which the tray is adapted to receive and a lower section 23 which projects slightly below the plane defined by the lower perimeter 14b of the lower set of skirts 12b. This lower section 23 of the pedestal 21 contains a centrally located cylindrical socket 25 adapted to receive the topmost part of the upper section 22 of the pedestal 21 of the tray immediately stacked below. The internal base 26 of the socket 25 is located at a distance from the lower perimeter of the lower pedestal section 23 so that the upper tray will not descend so far on the pedestal 21 of the lower tray so as to contact the eggs residing in the skirts of the lower tray. The mating relationship of the pedestals on the upper and lower trays prevents movement of the trays in lateral as well as vertical directions when they are in stacked relation. The upward projections 22 of the pedestals also serve the function of handles for placing the loaded trays into cases and for removing them. When the trays are empty, they can be rotated 90° about their central vertical axis so that the pedestals 21 will project through the circular orifices provided in the center of the lowermost portions 13b, 14b of the skirts 12a, 12b. This allows one to ship the empty trays in compact form. This allows one to ship the empty trays compacted to about 50% of the space required in assembled form.

In the present instance, lateral support means is provided to insure retention of the eggs in the skirts during handling of the trays and during tilting in the course of incubation. Lateral support is provided at the two opposing sides A and B of the tray by a series of five equidistantly spaced upwardly projecting lugs 32 which are upward extensions of the perimeter rib 20. Additional lateral support is also provided along the front and at two corners of the opposing ends of the tray by a series of upwardly projecting fingers 28 which project upwardly alongside of the receptacles at the outer perimeter of the tray. The front end of the tray has four pairs of fingers 28 spaced so that eggs nested in the longitudinal end of upper skirts are retained at two points about 30° left and right of an imaginary transverse vertical plane bisecting the longitudinal row of eggs.

Side A and side B of the tray are each provided with a set of six support legs or flanges 30 of equal size and height. The legs 30 depend slightly beyond the horizontal planes defined by the lowermost part 24b of the support pedestals 21 of the tray 10 and the lowermost portion 14b of the lower skirts and below the lowermost tips of the eggs held in the lower skirts. When three trays are mounted in the tray holding flanges 40 of an incubator, as shown in side-end view in FIG. 4, the support legs 30 elevate the tray above the base defined by an imaginary plane between the flanges 40. This provides a space immediately below the tray for the insertion of a gripping device (not shown) under the bottom of the three trays which will enable one to insert and extract three trays as a unit from the incubator tray holders.

As shown in FIGS. 1 and 2, the support legs are downward extensions of the outwardly-facing segment of the skirts in the rows alongside the sides of the tray. The curved form of the leg provides increased rigidity for supporting the loaded tray on the flanges 40. Furthermore, the distance between the opposite sides of the tray is selected to enable free sliding movement longitudinally of the flanges 40, but only limited clearance transversely of the flanges (see FIG. 4).

As is evident in FIG. 1, the front and rear ends of each tray are designed so that the rear of the first tray will mate with the front of a second adjacent tray, thus achieving the most compact form when placed in the incubator. The rear end of one tray will also mate with the rear end of the next tray when the tray is inadvertently reversed, as shown in FIG. 3. Care should be taken to place the front end of the first tray innermost on the flanges 40 so that the fingers 28 insure against the eggs in the first row falling into the center aisle of the incubator.

Other forms of bi-planar trays may also be designed to nest and stack in a similar manner. Furthermore, although the egg-holding skirts have been shown in a circular shape, they could be equally effective in a hexagonal or other multi-sided tubular form. Thus, while a particular embodiment of the present invention has been herein illustrated and described, it is not intended to limit the invention to such disclosure but changes and modifications may be made therein and thereto within the scope of the following claims.

We claim:
1. A unitary egg tray comprising:

a plurality of integrally connected egg-holding tubular receptacles arranged in transverse and longitudinal rows in said tray, said tubular receptacles in each row being staggered with respect to the tubular receptacles in the immediately adjacent parallel rows on either side of it, said transverse amd longitudinal rows of tubular receptacles occuppying in alternate sequence an upper horizontal plane and a lower horizontal plane, said tubular receptacles being of uniform size and shape at their upper perimeter so that they can receive and abut the lower midportion of an egg, each said receptacle having an orifice at its lower perimeter of such size and shape to provide clearance between the orifice and the lowermost part of the pointed tip of an egg nested in the receptacle, whereby each receptacle is adapted to hold in stable position eggs of varying size distribution, leg means positioned at two parallel opposed sides of said tray to support the tray, said leg means protruding to aa support level slightly below the horizontal plane tangent to the bottom of the lowermost egg tip held in said tray and also below the lowermost part of the receptacles;

stacking means protruding above the tubular receptacles in the upper plane of the tray for supporting and releasably interlocking with an adjacent tray disposed in such closely-spaced horizontal relation immediately above it so that the upper tray will not contact eggs in the lower tray; and socket means on the underside of said tray adapted to receive the stacking means of a downwardly adjacent lower tray, said socket means being above the support level of said leg means.

2. An egg tray according to claim 1 wherein said tubular receptacles are frustoconical skirts having downwardly converging side walls terminating at a circular orifice at the base of said skirt.

3. An egg tray according to claim 1 whrein said tray is made from a plastic material.

4. An egg tray according to claim 1 wherein said upwardly protruding stacking means comprises pedestals extending above the level of said eggs and slightly below the plane defined by the lower perimeters of the lower receptacles, the lower part of said pedestals containing said socket means which interlocks with the upper ends of said pedestals of a lower adjacent tray to prevent lateral movement of said trays when stacked.

5. An egg tray according to claim 1 wherein said leg means comprises integral flanges.

6. An egg tray according to claim 1, including lateral support means located about the periphery of the tray and integral thereto for restraining the outward movement of eggs held on the perimeter of the tray during handling or tilting of said tray.

7. An egg tray according to claim 1 wherein the lower perimeter of each lower skirt has a horizontal annular reinforcing web containing a central orifice large enough to allow the lower tip of an egg to protrude therefrom.

8. An egg tray according to claim 3 wherein aid plastic tray is made by injection molding.

9. An egg tray according to claim 4 wherein said pedestals are integral with and protrude above and below said skirts, and said socket means are formed in the bottom end of the pedestal.

10. An egg tray according to claim 8 wherein said plastic material is selected from the group consisting of linear polyethylene and polypropylene.

* * * * *

UNITED STATES PATENT OFFICE
CERTIFICATE OF CORRECTION

Patent No. 3,958,711    Dated May 25, 1976

Inventor(s) Robert C. Morris and Raymond C. Gantert

It is certified that error appears in the above-identified patent and that said Letters Patent are hereby corrected as shown below:

Column 1, line 61, "amoung" should be --amount--;
Column 1, line 68, "ben" should be --been--;
Column 3, line 46, "tken" should be --taken--;
Column 3, line 62, "ot" should be --to--;
Column 3, line 65, "hndling" should be --handling--;
Claim 1, line 7, "amd" should be --and--;
Claim 1, line 22, "aa" should be --a--;
Claim 3, line 1, "whrein" should be --wherein--;
Claim 8, line 1, "aid" should be --said--

Signed and Sealed this

Seventeenth Day of August 1976

[SEAL]

Attest:

RUTH C. MASON
Attesting Officer

C. MARSHALL DANN
Commissioner of Patents and Trademarks